United States Patent [19]

Ogden

[11] Patent Number: 4,943,436

[45] Date of Patent: Jul. 24, 1990

[54] BEER PRODUCTION

[76] Inventor: Ian E. Ogden, 53 Makara Road, Karori, Wellington, New Zealand

[21] Appl. No.: 326,470

[22] Filed: Mar. 21, 1989

Related U.S. Application Data

[63] Continuation of Ser. No. 69,897, Jul. 6, 1987, abandoned, which is a continuation of Ser. No. 733,133, May 10, 1985, abandoned.

[30] Foreign Application Priority Data

May 11, 1984 [NZ] New Zealand .......... 208134

[51] Int. Cl.$^5$ .......... C12C 7/00; C12C 11/04
[52] U.S. Cl. .......... 426/16; 426/14; 426/29; 426/592; 426/600; 426/495
[58] Field of Search .......... 426/11, 13, 14, 16, 426/592, 490, 493, 495, 600, 387, 28, 29

[56] References Cited

U.S. PATENT DOCUMENTS

| | | | |
|---|---|---|---|
| 4,499,117 | 2/1985 | Bonneau | 426/14 |
| 4,532,140 | 1/1985 | Bonnome | 426/16 |
| 4,581,236 | 4/1986 | Bandel et al. | 426/16 |

*Primary Examiner*—Marianne Cintins
*Attorney, Agent, or Firm*—Scully, Scott, Murphy & Presser

[57] ABSTRACT

The invention relates to beer production and intermediate products for use therein. In particular, the present invention relates to a process for the production of a beer wherein, prior to fermentation, the wort is subjected to a separating technique to produce one product, lower in fermentable low molecular weight components of the wort, in substantially the same concentration as the feedstock, and subsequently fermenting that product to produce a beer.

The invention also relates to the wort products obtained by the separation techniques.

6 Claims, No Drawings

BEER PRODUCTION

This application is a continuation, of application Ser. No. 069,897, filed July 6, 1987, now abandoned which is a continuation of USSN 733,133 filed May 10, 1985 now abandoned.

This invention relates to beer production and intermediate products of use therein.

In the production of beer the first step is producing from barley malt a "wort". The wort is then combined with flavour producing agents such as hops, additional carbohydrates, etc. and then fermented with yeast to obtain a beer which can be further modified as desired.

The possible variations in the process are immense to produce fine changes in flavour in the finished beer, to produce different types of beer, and variations in alcohol content and in calorific content. Even minor variations in such things as times involved in fermenting, and the nature and qualities of additives and the wort can have a major influence on the ultimate taste in the beer.

Many proposals occur in the patent and other technical literature for the production of low alcohol and low calorie beer. Low alcohol beer has become increasingly in vogue over the last decade in a number of western countries caused by social change and also legislative change particularly through harsh penalties for alcohol affected driving. However, the pursuit of low alcohol beers has occupied beer makers for much longer than just the recent past. There have been a number of proposals which have resulted in commercially produced products but acceptance of the product by the public has not been as great as might be desired. One reason for the lack of acceptance has been ascribed to the lack of depth in the flavour of the beer.

This invention provides a method of producing a low alcohol beer comprising producing a wort, removing from the wort at least some of low molecular weight fermentable components, and then processing the wort to make a beer.

In a further aspect of the invention there is provided a process for making a low calorific beer comprising forming a wort, removing from the wort low molecular weight fermentable components, and processing those fermentable components into a beer.

The invention also provides for wort having removed therefrom the low molecular weight fermentable components and furthermore as a product the fraction containing the low molecular weight fermentable component itself.

The wort of a beer includes carbohydrates in which the low molecular weight components such as the mono, di and trisaccharides are those which are most susceptible to fermentation by an active yeast in the beer making process. In fermentation the lower molecular weight saccharides are converted to alcohol while the higher molecular weight carbohydrates and other materials added or inherently present in the wort do not ferment to the same extent as the lower molecular weight components and provide the calorific value and also the flavour of the beer. By removing the low molecular weight components the amount of fermentable components in the wort is thereby reduced and thus the alcohol content in the final beer can be reduced accordingly whilst still retaining the "body" and/or the flavour of the beer.

It is important in the process of the invention for the method of separating low molecular weight components from the wort to be first selective to a substantial extent on the desired components and second have as little effect as possible on the desirable characteristics of the remaining constituents in the wort. In this way the resultant flavour characteristics in the beer produced by the wort can be retained as much as possible.

In accordance with this invention it has been found than an ultrafiltration process can be used. In this process it has been found that membranes can be selected with a suitable molecular weight (M.W.) cut-off point to permit passage to the low M.W. components but retain as much as possible of the other components of the wort. Ultrafiltration membranes (UF membranes) are produced with a "nominal" M.W. cut-off value as identified by the suppliers. U.F. membranes and processes are to be distinguished from Reverse Osmosis (R.O.) membranes and processes. A U.F. membrane has a normal M.W. cut-off point of 300 or greater. An R.O. membrane has a M.W. cut-off point of less than 300. The nominal values recommended by suppliers are indicators of molecular weight passage rather than accurate measurement. Many factors are involved in this. For example most UF membranes are designed for protein separation and the protein molecule tends to adopt a spherical shape. Other molecules such as carbohydrates tend to be linear in structure. As the nominal M.W. cut off value of a UF membrane is selected on molecule size, a pore size defined with reference to the molecular weight of a protein will obviously be too small to allow passage of a molecule of the same M.W. but of a linear structure except when the molecule is linerally aligned with the pore. In addition there are other factors effecting the molecule size such as the degree of hydration of a molecule in aqueous solution which can increase the effective molecular size and hence whether it is retained or permeates through the membrane. Such hydration degree may bear no relationship to the molecular weight.

The invention envisages removing low M.W. components such as glucose, sucrose and fructose whilst retaining higher molecular weight components. The U.F. system of this invention can be designed to permit permeation of a substantial proportion of low molecular weight components whilst retaining higher molecular weight components dependant upon the nominal cut-off point. The amount of dissolved solids in the permeate is a function of time, a function of the nominal cut-off point and a function of process parameters such as pressure and configuration of the filtration membrane. All these factors with suitable trial and error can be controlled to produce a desired degree of permeation of the low molecular weight components. Variations in such factors can be used to provide a degree of variation in the alcohol content in the final product.

The analysis of a typical feedstock and products of a U.F. sepration process using a membrane supplied by A/S De Danske (Sukkerfabrikker) with a nominal 25000 M.W. cut-off is as follows:

original wort: 17% solids
retentate: 21% solids
permeate: 11% solids

The permeate will contain lower M.W. fementable components and also water from the wort. The more concentrated retentate will still have fermentable components but at a lower proportion of the total solids. On fermentation a beer can be obtained with a higher solids content and the normal alcohol content which may find market acceptance, or by dilution to reduce the solids content back to a normal level—a low alcohol beer. Dilution can occur before or after fermentation and to any desired degree.

The M.W. cut-off point of the ultrafiltration membrane is one of the many variables in the process of the invention. The low M.W. components referred to above, namely sucrose, fructose and glucose have a M.W. of less than 500. It is has however been found, at least with those UF membranes currently tested, that a membrane with a nominal M.W. cut-off of 500 does not allow passage of these simple sugars. All that permeates is water.

Current tests with membranes do show that the relationship of effectiveness to nominal MW cut-off can vary from supplier to supplier. For example nominal M.W. cut-off values of 25,000 and 20,000 for membranes supplied by A/S De Danske Sukkerfabrikker do show an acceptable permeation of low M.W. components at an acceptable rate whilst substantially all the desirable high M.W. components are retained in the retentate. On the other hand membranes supplied by Abcor and Alfa-Laval having a nominal MW cut-off of 5,000 provide acceptable separation. The amount of fermentable low M.W. components which remain in the retentate can be varied to adjust the alcohol content in the final product in relation to the flavour and calorific value of the product.

The alcohol content in the final beer can be further varied by the degree of fermentation and by dilution with water. Thus the invention in its broadest aspect provides a further process operation which can be varied to produce a beer having desired character such as a low alcohol content.

The low molecular weight permeate is suitable for production of a low calorific value beer. Being composed substantially of fermentable materials, on fermentation with yeast, the amount of remaining sugars in the product can be reduced to a desired low level or adjusted to any level as may be suitable.

By choice of a suitable UF membranes the process of the invention can be run continuously or batch-wise.

The products resulting from the separation process of the wort are also features of the invention as they can be marketed as such to breweries or to the consumer.

The following example is illustrative of the current invention:

A GR61PP membrane (8.5 m$^3$) A/S De Danske Sukkerfabrikker) having a nominal 20,000 M.W. cut off was installed on an R.O.-30′module. A wort having a specific gravity of 1070 was processed with said membrane with a transmembrane pressure of 11.5 bar at a temperature of 75° C. An initial wort volume of 20 liters was employed. Under these conditions an average flux-rate of 8.1 1/m$^2$h is obtained over a 5 hour batch operation, giving a 2.5 concentration factor. The permeate can be used to make a low calorific beer whilst the retentate can be used to make various types of beer such as a low alcohol beer.

Whilst this invention has been described with reference to preferred embodiments it is to be construed as not being limited thereto and in addition where specific materials or process steps have been described and equivalents are known to exist thereto, such equivalents are included herein as if specifically set forth.

I claim:

1. In a process for the production of a low-alcohol beer wherein a wort is produced by the mashing of barley, said wort being combined with hops, additional carbohydrates and flavoring agents and subsequently fermented with yeast to obtain a beer, the improvement comprising subjecting the wort, prior to fermentation, to ultrafiltration through a membrane effective to permit passage of mono-, di-, and trisaccharides thereby producing (1) a retentate as a first product having a lower quantity of low molecular weight components than said wort prior to said ultrafiltration and (2) a permeate as a second product richer in fermentable low molecular weight components then said wort; and fermenting said first product to produce a low alcohol beer.

2. In the process of claim 1, the further improvement comprising fermenting said second product to produce a low calorie beer.

3. The process of claim 1 in which the membrane molecular weight cut-off is about 20,000 to 25,000.

4. The process of claim 1 in which the membrane molecular weight cut-off is about 5,000.

5. An unfermented wort product comprising an ultrafiltered retentate obtained by subjecting an unfermented wort to ultrafiltration through a membrane designed to permit passage of mono-, di- and trisaccharides into a permeate while retaining the higher molecular weight components of said wort in a retentate and recovering the retentate.

6. An unfermented wort product comprising an ultrafiltered permeate obtained by subjecting an unfermented wort to ultrafiltration through a membrane designed to permit passage of mono-, di- and trisaccharides into a permeate while retaining the higher molecular weight component of said wort in a retentate and recovering the permeate.

* * * * *